US007770539B1

(12) United States Patent
Zimmerman et al.

(10) Patent No.: US 7,770,539 B1
(45) Date of Patent: Aug. 10, 2010

(54) CANINE EXERCISE WHEEL

(75) Inventors: Raymond G. Zimmerman, Ephrata, PA (US); Aaron Burkholder, Kutztown, PA (US)

(73) Assignee: GoPet, LLC, Martindale, PA (US)

( * ) Notice: Subject to any disclaimer, the term of this patent is extended or adjusted under 35 U.S.C. 154(b) by 481 days.

(21) Appl. No.: 11/715,235

(22) Filed: Mar. 6, 2007

(51) Int. Cl.
*A01K 15/02* (2006.01)
*A01K 29/00* (2006.01)

(52) U.S. Cl. ........................ 119/700; 119/702; 482/54

(58) Field of Classification Search ......... 119/700–704, 119/421, 427, 452, 482, 58, 60, 61.1, 61.57; 482/66, 69, 78, 132; 248/235, 247, 250
See application file for complete search history.

(56) References Cited

U.S. PATENT DOCUMENTS

| 528,066 | A | | 10/1894 | Ariens ........................ 119/29 |
| 883,485 | A | * | 3/1908 | Ridgway ..................... 472/48 |
| 1,794,951 | A | * | 3/1931 | Freer .......................... 119/700 |
| 2,640,460 | A | * | 6/1953 | Siegel ......................... 119/455 |
| 2,681,040 | A | * | 6/1954 | Kniesteadt .................. 119/452 |
| 3,057,328 | A | * | 10/1962 | Swartz ........................ 119/700 |
| 3,788,277 | A | * | 1/1974 | Willinger et al. ............ 119/700 |
| 4,088,094 | A | | 5/1978 | Howard ....................... 119/29 |
| 5,088,446 | A | * | 2/1992 | Campiotti ................... 119/421 |
| 5,125,361 | A | * | 6/1992 | Rowlands .................... 119/700 |
| 5,312,312 | A | * | 5/1994 | Fernandez et al. ............ 482/60 |
| 5,649,503 | A | * | 7/1997 | Woolfolk .................... 119/700 |
| D484,284 | S | | 12/2003 | Venson ...................... D30/160 |
| 6,668,759 | B1 | * | 12/2003 | Jaeger ........................ 119/700 |
| 6,740,009 | B1 | * | 5/2004 | Hall ............................. 482/54 |
| 7,299,767 | B2 | * | 11/2007 | Tominaga et al. ........... 119/700 |

FOREIGN PATENT DOCUMENTS

| GB | 2384967 A | * | 8/2003 |
| JP | 200201560 A | * | 7/2000 |
| WO | WO 03056908 A1 | * | 7/2003 |

* cited by examiner

*Primary Examiner*—Son T Nguyen
*Assistant Examiner*—Danielle Clerkley
(74) *Attorney, Agent, or Firm*—Miller Law Group, PLLC

(57) ABSTRACT

An exercise wheel is configured to support canines and provide an apparatus that will enable the canine to exercise within a confined space. The exercise wheel is supported on a three bearing stance that can be configured in a freestanding configuration or in a configuration that is mounted to the exterior wall of a dog kennel. In the mounted configuration, the dog will have an unrestricted access to exercise without leaving the confinement provided by the dog kennel. The exercise wheel is freely rotatable from a frame affixed to the kennel wall with a gap between the wheel periphery and the kennel wall being covered by a plastic seal. The circumferential periphery of the exercise wheel is formed of wire mesh to allow waste and debris to pass through.

19 Claims, 6 Drawing Sheets

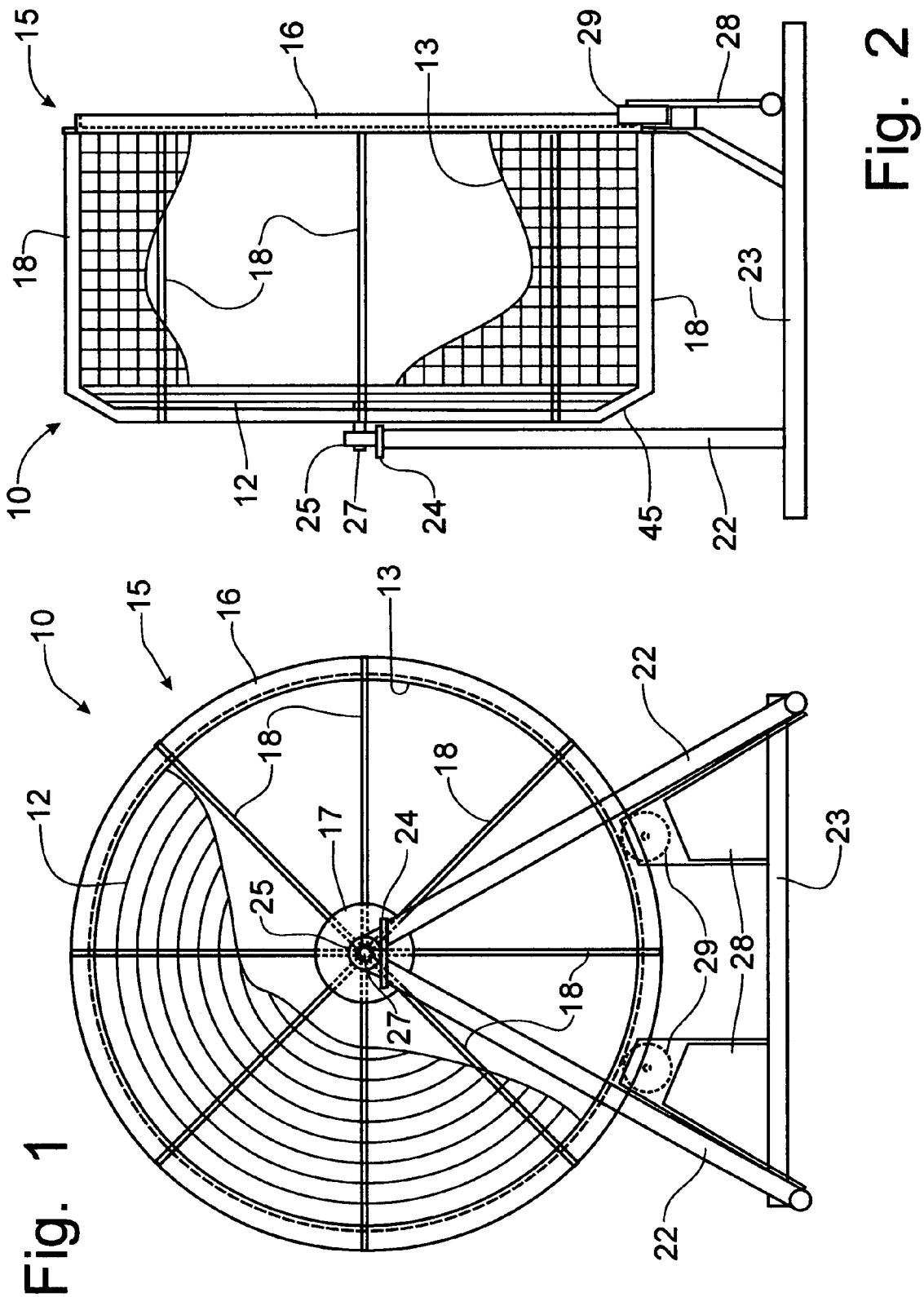

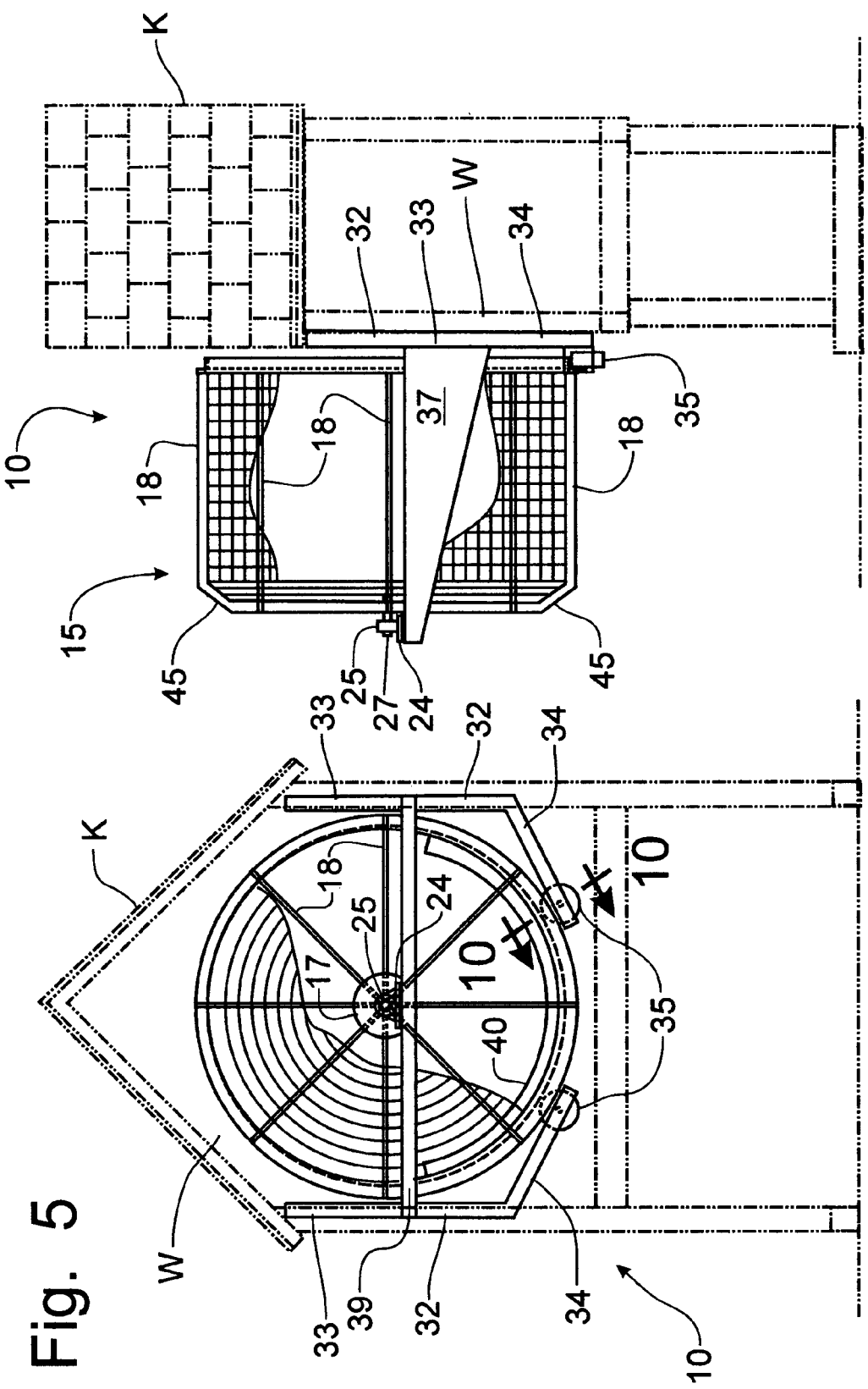

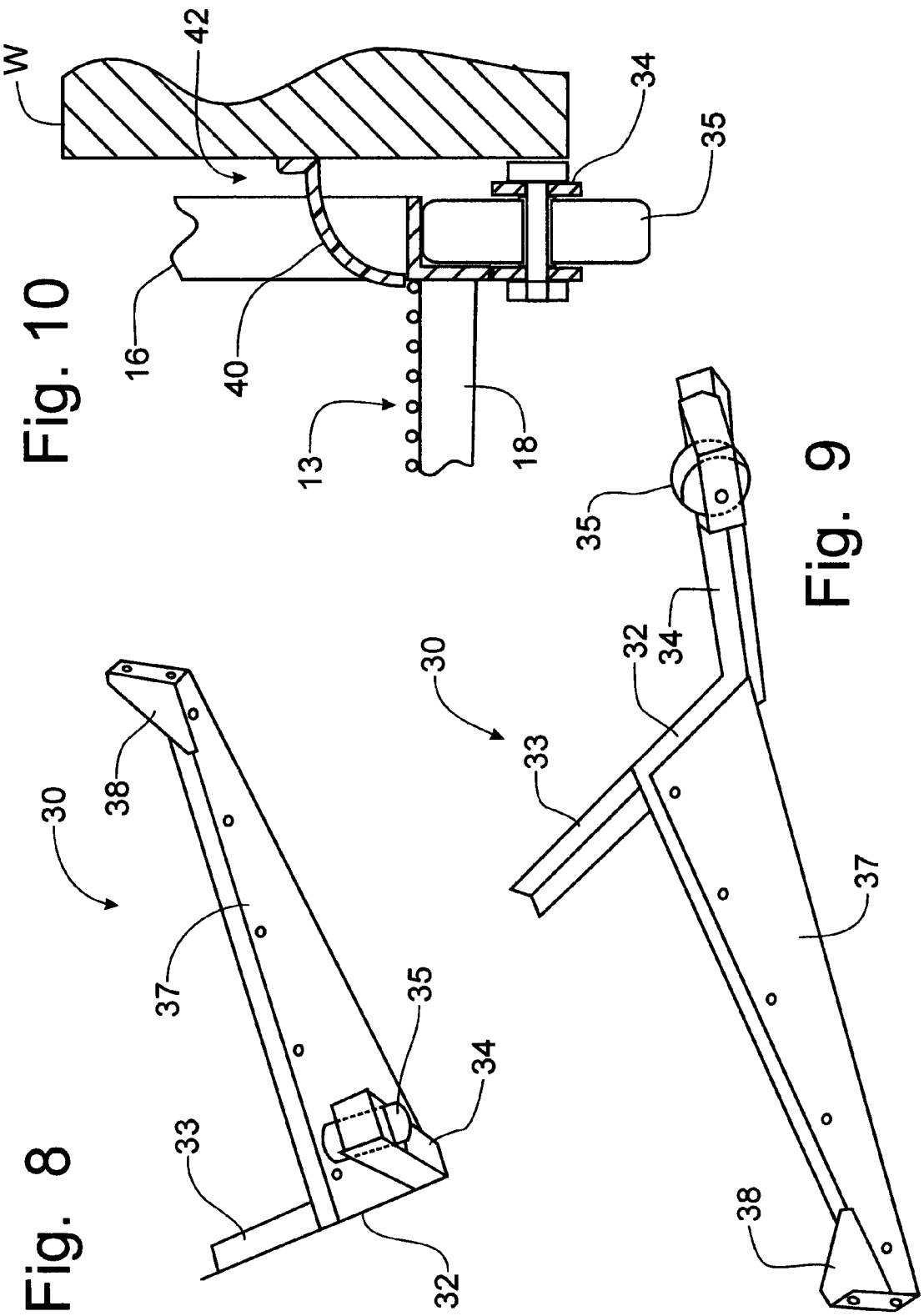

CANINE EXERCISE WHEEL

FIELD OF THE INVENTION

The present invention relates generally to an exercise wheel for use by dogs to provide an apparatus through which dogs can get exercise within a confined space, and, more particularly, to a canine exercise wheel that can be mounted to a kennel to allow a dog housed inside the kennel to seek exercise as desired.

BACKGROUND OF THE INVENTION

Providing an exercise wheel by which animals can exercise without leaving a confined spaced is found within the prior art; however, none of the exercise wheels are configured to support a dog, particularly a large dog. For example, a cat exercise wheel is disclosed in U.S. Design Pat. No. D484,284, granted on Dec. 23, 2003, to Elmer Venson, et al. This cat exercise wheel is primarily intended for the animal to be walking on the interior surface or on the exterior circumference of the wheel and does not have the height or the width to permit a dog to walk within the interior surface of the wheel. Furthermore, this small exercise wheel is supported only on a central axial cantilevered bearing support that would not be adequate to support the weight of a dog.

U.S. Pat. No. 528,066, issued on Oct. 23, 1894, to Henry Ariens, teaches an exercise wheel that is intended for use by dogs. This exercise wheel is rotatably supported on an axially aligned bearing that enables the wheel to support the weight of a dog in a freestanding configuration although the support stand framework to position the axial bearing in an elevated location makes the entry to and the exit from the exercise wheel a dangerous and cumbersome task for the animal that is to utilize the exercise wheel. As a result, an exercise wheel of this configuration would not be commercially acceptable. Certainly, the Ariens exercise wheel would not be amenable to be mounted on a dog kennel to permit dogs housed therein to utilize the exercise wheel without leaving the confined kennel space.

The exercise wheel found in U.S. Pat. No. 1,794,951, granted on Mar. 3, 1931, to James Freer is configured to be used by small fur bearing animals, such as minks and foxes that are kept in captivity with the exercise wheel being mounted within the pen housing the animals. As with the Venson cat exercise wheel, this animal exercise wheel is supported on a cantilevered axial bearing and cannot withstand the weight of large animals. The Freer exercise wheel does resolve one problem associated with a freestanding exercise wheel, such as is found in the aforementioned Ariens patent, by mounting the exercise wheel on a cantilevered axial bearing support and closing the rear of the exercise wheel by a solid disk, the risk of injury to the animal by the shearing relationship between the support frame and the rotating wheel is eliminated. Because of the cantilevered mounting, however, the Freer exercise wheel is not readily mountable on the exterior surface of a dog kennel to permit a dog housed therein to gain access thereto for exercise without leaving the confinement of the dog kennel.

Similar to the Freer exercise wheel, a tread drum for animals, such as primates, having a cantilevered axial bearing support is disclosed in U.S. Pat. No. 4,088,094, issued on May 9, 1978, to Wayne Howard and assigned to NASA. This tread drum is intended to force animals utilizing the drum to exercise at a predetermined rate by incorporating a shocking apparatus that will stimulate the animal to move on the tread drum. As with the other known exercise wheels discussed above, the rotational support for the wheel itself is provided by an axial bearing extending in a cantilevered manner from a support frame. The tread drum disclosed in U.S. Pat. No. 5,125,361, granted to Scott Rowlands on Jun. 30, 1992, provides a unique four bearing support with rollers positioned along the outer circumference at the bottom portion of the tread drum that will adequately support the weight of a dog. The Rowlands exercise wheel is configured to be mounted on a base that can be easily disassembled from the exercise wheel. Without a support frame positioning an axial bearing support for the exercise wheel, the Rowlands tread drum has no pinch points that would present a danger to the animals using the exercise wheel. However, the Rowlands tread drum is not readily mountable to a dog kennel to allow dogs therein to obtain exercise without leaving the confinement of the dog kennel. Also, without a support frame, a dog could literally knock the Rowlands exercise wheel off of the roller bearings.

It would be desirable to provide an exercise wheel that can be used in a freestanding configuration or deployed on the exterior surface of a dog kennel to allow a dog housed within the kennel to gain access to the exercise wheel without leaving the confinement provided by the dog kennel.

SUMMARY OF THE INVENTION

It is an object of this invention to provide an exercise wheel for a dog that overcomes the aforementioned disadvantages of the known animal exercise wheels and tread drums.

It is a feature of this invention that the exercise wheel is supported on three bearings, including an exteriorly oriented axial bearing and a pair of rollers along the lower front periphery of the exercise wheel.

It is an advantage of this invention that the three bearing support for the exercise wheel is provided on a frame that can be configured in a freestanding form or in a form that is mounted to the exterior wall of a dog kennel.

It is another advantage of this invention that the three bearing support provides adequate support for carrying the weight of canines utilizing the exercise wheel.

It is another feature of this invention that the axial bearing is spaced longitudinally from the two roller bearings to provide a stable support mechanism for the rotational operation of the exercise wheel.

It is still another feature of this invention that the exercise wheel can be mounted on exterior wall of a dog kennel.

It is another object of this invention to provide an exercise wheel that can be mounted on an exterior wall of a dog kennel to provide a source of exercise for a dog confined within the dog kennel.

It is still another advantage of this invention that a dog housed within a kennel structure can be exercised without leaving the confinement provided by the dog kennel.

It is yet another feature of this invention that the three bearing support mechanism can be mounted in a frame apparatus that can be detachably mounted to a vertical exterior wall of a dog kennel.

It is a further advantage of this invention that a dog housed within a kennel can have unrestricted access to exercise without leaving the confinement of the kennel.

It is a further feature of this invention that a gap between the kennel wall and the periphery of the exercise wheel can be covered by a plastic seal.

It is yet another advantage of this invention that the plastic seal covering the gap between the kennel wall and the periphery of the exercise wheel is affixed to the kennel wall and does not restrict the rotation of the exercise wheel.

It is still a further feature of this invention that the circumferential periphery and the outer generally vertical wall of the exercise wheel are formed from wire to allow the passage of waste and debris through the exercise wheel.

It is still another object of this invention to provide an exercise wheel for use by canine which is durable in construction, inexpensive of manufacture, carefree of maintenance, facile in assemblage, and simple and effective in use.

These and other objects, features and advantages are accomplished according to the instant invention by providing an exercise wheel configured to support canines and provide an apparatus that will enable the canine to exercise within a confined space. The exercise wheel is supported on a three bearing stance that can be configured in a freestanding configuration or in a configuration that is mounted to the exterior wall of a dog kennel. In the mounted configuration, the dog will have an unrestricted access to exercise without leaving the confinement provided by the dog kennel. The exercise wheel is freely rotatable from a frame affixed to the kennel wall with a gap between the wheel periphery and the kennel wall being covered by a plastic seal. The circumferential periphery of the exercise wheel is formed of wire mesh to allow waste and debris to pass through.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a rear elevational view of an exercise wheel in a freestanding configuration incorporating the principles of the instant invention, the wire covering over the back side of the exercise wheel being broken away for purposes of clarity of the underlying structure;

FIG. 2 is a side elevational view of the exercise wheel shown in FIG. 1, the wire mesh covering around the circumferential periphery of the wheel being broken away for purposes of clarity of the underlying structure;

FIG. 5 is an elevational view of the exercise wheel mounted on the exterior wall of a dog kennel according to the principles of the instant invention, the wire covering being broken away for purposes of clarity, the representative kennel structure being shown in phantom;

FIG. 6 is a side elevational view of a configuration of the exercise wheel mounted to a wall of a dog kennel as depicted in FIG. 5, the wire covering being broken away for purposes of clarity, the representative kennel structure being shown in phantom;

FIG. 8 is a perspective view of the frame member affixed to the kennel wall to support the exercise wheel for rotation;

FIG. 9 is another perspective view of the opposing frame member affixed to the kennel wall to support the exercise wheel; and FIG. 10 is an enlarged partial cross-sectional view of the roller mount supporting the exercise wheel for rotational movement relative to the wall of the dog kennel to which the exercise wheel is mounted, corresponding to lines 10-10 of FIG. 5.

DETAILED DESCRIPTION OF THE PREFERRED EMBODIMENT

Figure 3:
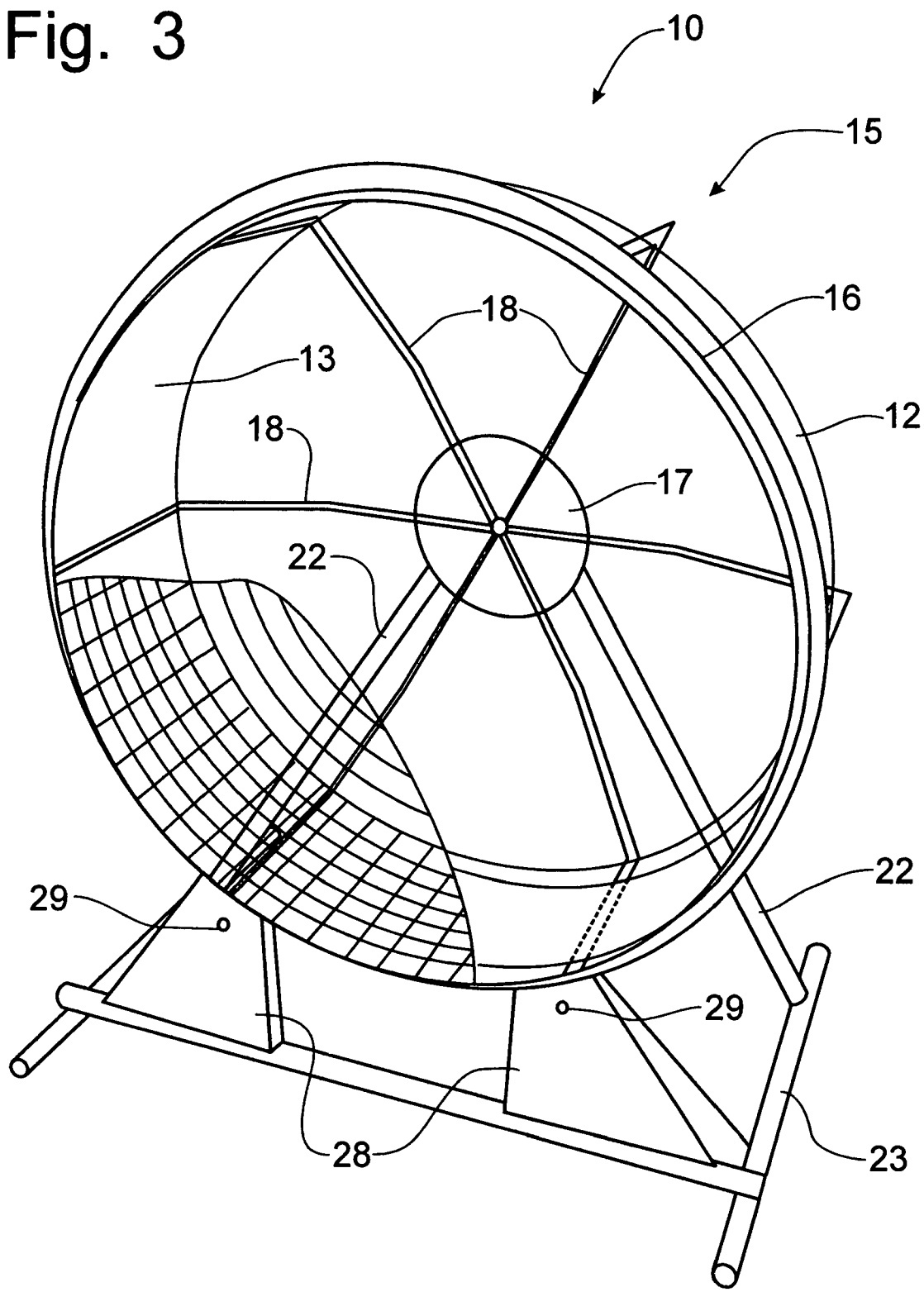
FIG. 3 is a front perspective view of the exercise wheel shown in FIG. 1, the wire covering being broken away for purposes of clarity.
Figure 4:
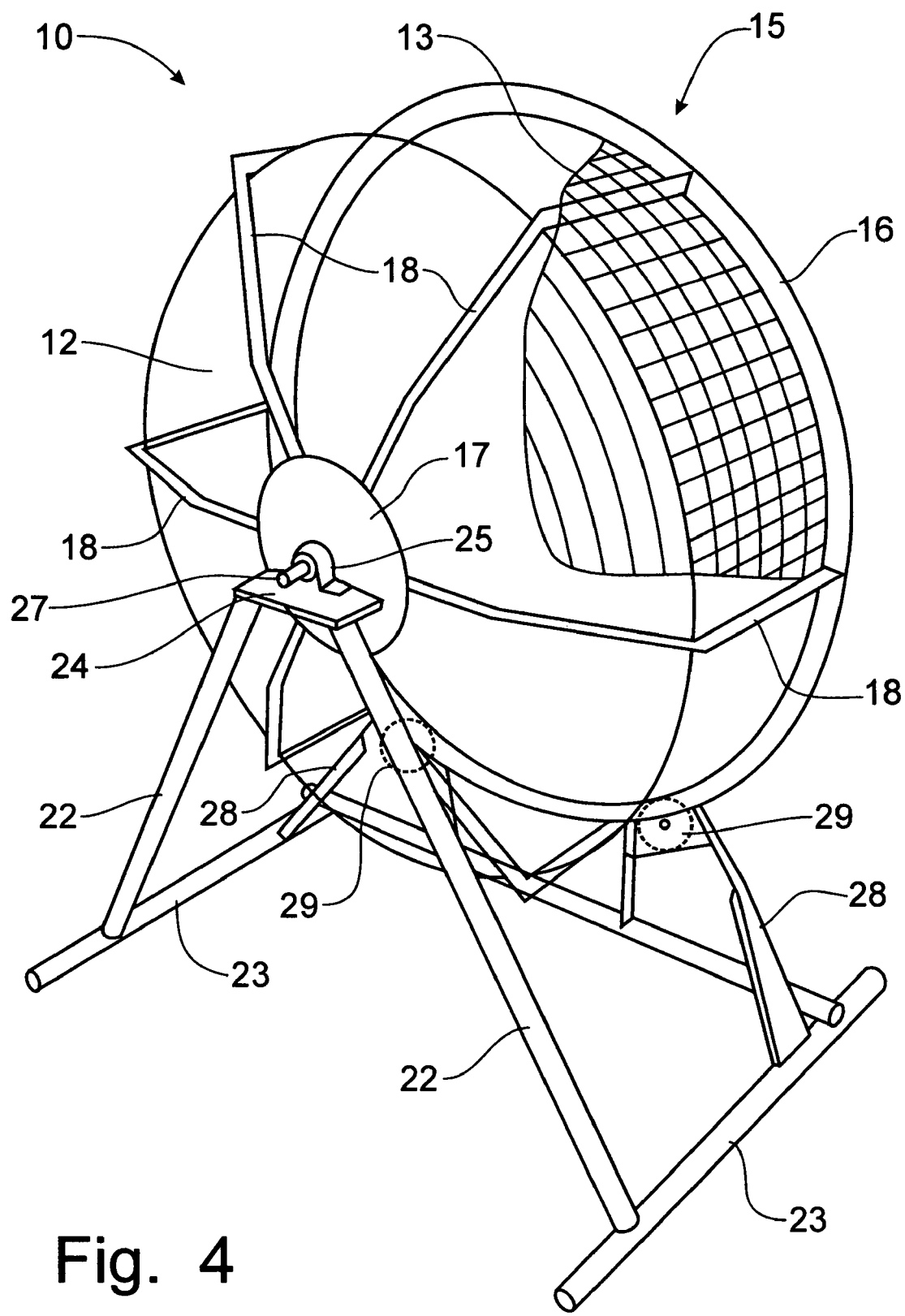
FIG. 4 is a rear perspective view of a the exercise wheel shown in FIG. 1, the wire covering being broken away for purposes of clarity.

Referring now to FIGS. 1-4, an exercise wheel for exercising canines in a confined spaced, and incorporating the principles of the instant invention, can best be seen. The exercise wheel 10 is a generally cylindrical structure oriented vertically with a rear wall 12 formed of an open wire covering oriented vertically. The circumference of the cylindrical structure defines a tread portion 13 on which the dog can walk and cause the exercise wheel 10 to rotate. The tread portion 13 is preferably covered with a wire mesh of a size that will not injure or irritate dog's feet. Alternatively, the tread portion 13 can be covered with a non-skid rubber or elastomeric mat 14, best seen in FIG. 3, that is secured to the frame underlying the tread portion 15. Leaving the tread portion 13 in a wire mesh form will enable waste and other debris to pass through the tread portion 13 to the ground below.

The frame 15 supporting the wire covering on the back wall 12 and on the tread portion 13 is formed with a circular front rim 16, preferably formed in an L-shaped angle to engage the rollers 29 as will be described in greater detail below, a center disk 17 at the center of the back wall 12 and generally L-shaped support arms 18 defining a spider that extends between the center disk 17 and the circular ring 16. Preferably, the spider support arms 18 are equidistantly spaced around the circular ring 16. The wire covering on the back wall 12 can be welded to the spider support arms 18, which are in turn welded to the disk 17 and the circular ring 16. Similarly, the wire mesh can be affixed, as by welding, to the spider support arms 18 extending beneath the tread portion 13 of the exercise wheel 10.

The support frame 20 supporting the exercise wheel 10 in an elevated position above the ground for rotational movement can be formed in a freestanding configuration, as shown in FIGS. 1-4, or in a mounted configuration as will be described in greater detail below. The freestanding support frame 20 provides a three-bearing support stance for the exercise wheel 10 to enable the wheel to adequately support the weight of a large dog utilizing the wheel 10. The freestanding support frame 20 is formed in generally a triangular configuration with a pair of support legs 22 extending upwardly from a base portion 23 to meet at an apex where an axial bearing 25 is located. The axial bearing 25 is supported on a bearing support plate 24 forming the apex of the support legs 22 and rotatably mounts a shaft 27 affixed to the center disk 17 and defining the axis of rotation of the exercise wheel 10. The shaft 27 extends rearwardly from the center disk 17 rather than project into the interior of the cylindrical structure of the wheel 10. Thus, the exercise wheel 10 rotates forwardly of the support legs 22 and above the base portion 23.

Projecting upwardly from the base portion 23 at the forward circular rim 16 is a pair of roller supports 29, each of which rotatably mounts a roller 29 that is placed into engagement with the circular rim 16 to support the weight of the exercise wheel 10 and the occupant thereof. The fore-and aft spacing of the axial bearing 25 at the rear of the exercise wheel 10 and the roller supports 29 at the front side of the exercise wheel 10 provides a stable three-point stance for the operation of the exercise wheel 10. As is best seen in FIGS. 2 and 10, the circular rim 16 rests on top of the rollers 29 for rotation about the axis of rotation defined the shaft 27 rotatably supported in the axial bearing 25.

Operation of the freestanding exercise wheel 10 is very simple. The dog is led onto the tread portion 13 on the interior side of the circumferential periphery of the cylindrical exercise wheel 10 and encouraged to simply walk. The freely rotating wheel 10 will move beneath the dog as it walks along the tread portion. The speed of rotation is controlled by the dog, as is the starting and stopping of the rotation of the wheel 10. The freestanding configuration of the exercise wheel 10 can be utilized in an area in which the dog does not have sufficient room to exercise properly. For example, the freestanding exercise wheel 10 would be an ideal exercise tool for use indoors in a house or apartment, or outdoors in a small yard.

Figure 7:
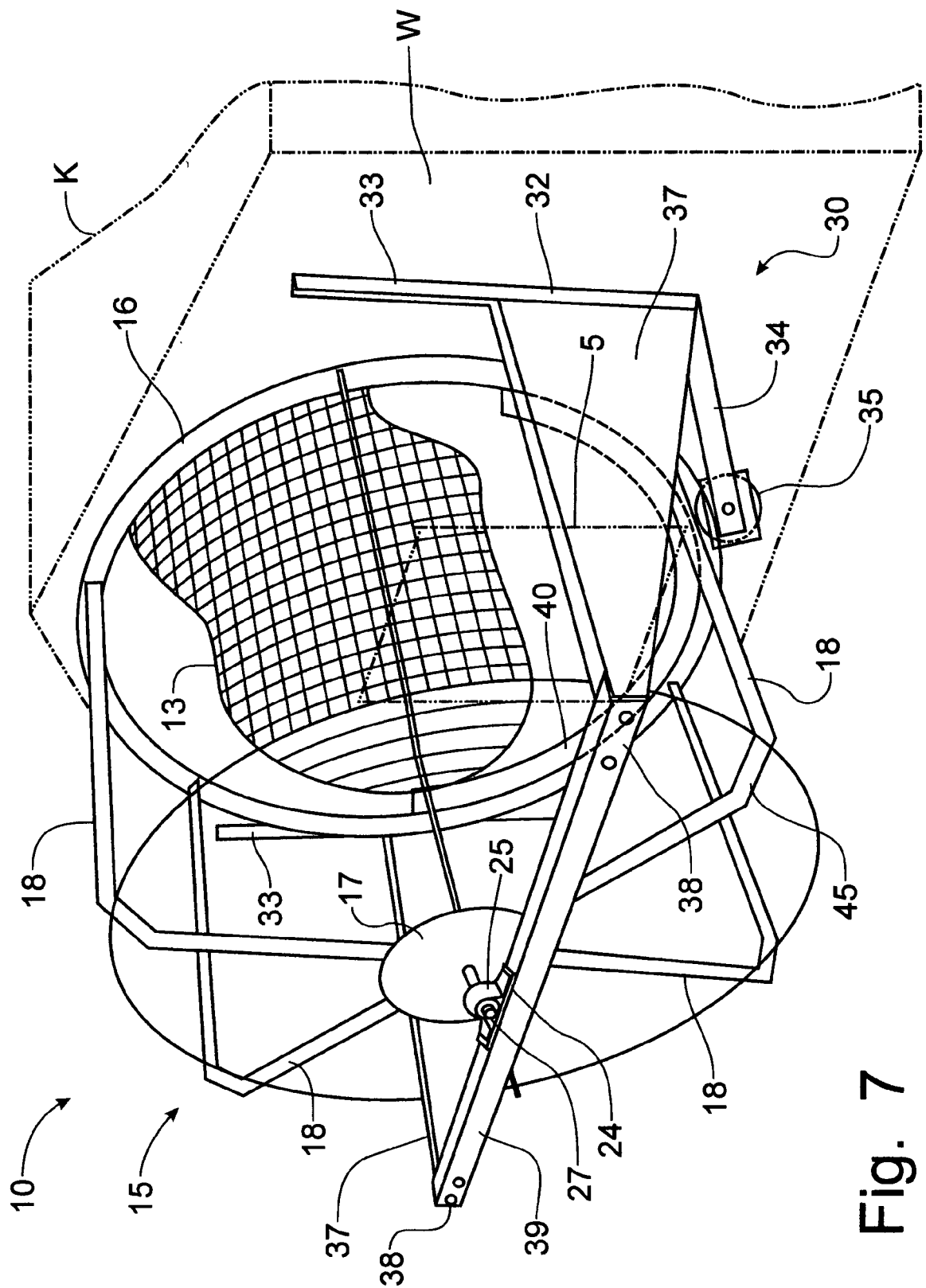
FIG. 7 is an enlarged perspective view of the exercise wheel shown in FIGS. 5 and 6 with the wire covering being broken away for purposes of clarity, the representative kennel structure being shown in phantom.

Referring now to FIGS. 5-10, a mounted version of the exercise wheel 10 can best be seen. Some states and local governments are requiring a mandatory exercise period for animals housed in a kennel or other enclosed space where the dog is not free to run and exercise. Although most dog kennels are not sufficiently large in size to permit the deployment of a freestanding configuration of the exercise wheel 10 within the dog kennel, the exercise wheel 10 presents an ideal apparatus for permitting a dog housed in a confined space to gain some exercise. By cutting an exit opening 5 in a vertical wall W of the kennel structure K and mounting the exercise wheel 10 on the vertical wall W so that the confined dog can exit the kennel K and step onto the tread portion 13 of the exercise wheel 10, as will be described in greater detail below, the dog can have an unrestricted amount of exercise without leaving the confinement provided by the kennel K.

The mounted frame 30 for the exercise wheel 10 is formed of left and right support members 32 which are formed as mirror images of one another, as can be seen best in FIGS. 8 and 9, and affixed to the vertical wall W of the kennel K. Each support member 32 has a fixation bracket 33 that is connected, such as by bolts or screws, to the exterior surface of the kennel wall W. From the lower end of each fixation bracket 33, a roller support arm 34 extends inwardly toward the exercise wheel 10. Each roller support arm 34 rotatably supports a roller 35 that is positioned into engagement with the circular ring 16 that is positioned adjacent to the exterior surface of the kennel wall W for a rotatable support thereof as is described in detail above with respect to the freestanding version of the exercise wheel 10.

Each fixation bracket 33 is also formed with an outwardly extending mounting arm 37 that is oriented generally horizontally to project generally perpendicularly to the plane of the exterior surface of the kennel wall W. At the distal end 38 of each mounting arm 37 an attachment bracket 38 is formed. A transverse strut 39 is connected to each respective attachment bracket 38 and extends behind the back wall 12 of the exercise wheel 10 from one mounting arm 37 to the other. The bearing support plate 24 is mounted at the center of the transverse strut 39 to support the axial bearing 25 rotatably mounting the rearwardly extending shaft 27 defining the axis of rotation of the exercise wheel 10. Accordingly, the mounted version of the exercise wheel 10 is also supported on a three-point stance by three bearings to rotatably support the exercise wheel 10 is close proximity to the kennel wall W.

The physical structure of the exercise wheel 10 in the mounted version is substantially identical to that described above with respect to the free standing version of the exercise wheel 10. The width of the tread portion 13 can vary according to the intended use of the wheel 10. For example, the longitudinal width of the tread portion 13 for the mounted version of the exercise wheel 10 might be greater than on the freestanding version because more than one dog might be using the mounted version as multiple dogs could be housed in the kennel K and the use of the exercise wheel 10 is not typically monitored. Likewise, the diameter of the wheel 10 could be anywhere between three feet and 5 feet depending on the intended usage of the wheel 10. If large dogs are expected to be using the exercise wheel 10, a larger diameter would be desired for the comfort of the animal using the wheel 10. In the mounted configuration, the diameter of the wheel 10 would also be a function of the size of the kennel K to which the exercise wheel 10 is to be attached. The exit opening 5 in the kennel wall W needs to be position in general alignment with the bottom of the wheel so that the dog can easily enter and exit the tread portion 13.

As is best seen in FIGS. 6 and 10, the circular ring 16 is positioned as closely to the kennel wall W as possible. However, a gap 42 between the circular ring 16 and the wall W is necessary to prevent interference between the wheel 10 and the wall W so as to allow the exercise wheel to freely rotate as the dog walks along the tread portion 13. To cover this gap 42 and prevent a dog's paw from being caught in the gap 42 and cause injury to the animal, a semi-circular seal 40 is affixed to the kennel wall W and positioned over the gap 42 such that the circular ring 16 rotates beneath the seal 40. Preferably, the seal 40 will extend over the lower half of the exercise wheel 10 to cover the gap 42; however, the seal 42 could extend completely around the peripheral edge of the circular ring 16.

As can be seen best in FIGS. 2 and 6, the back wall 12 of the exercise wheel 10 can be formed with a chamfer 45 formed as a sloped surface that extends around the rearward edge of the tread portion 13. This sloped surface 45 would provide a buffer between the horizontally oriented tread portion 13 and the vertically oriented back wall 12 to prevent the injury to the dog by mis-stepping onto the back wall 12 as the animal is exercising on the tread portion 13. The size and angle of this sloped chamfer 45 can be varied according to the intended use of the exercise wheel. The larger the animal that is expected to use the wheel 10, the greater the diameter of the wheel 10 and the larger the sloped chamfer 45 should be. The chamfer 45, however, may not be desirable in all circumstances and the exercise wheel 10 can be formed with the tread portion 13 joining the back wall 12 at a ninety (90) degree angle. In most circumstances, it is believed that the non-chamfered configuration would be preferred.

The structure define above for the exercise wheel 10 provides an unobstructed ingress and egress for the animal due to the frame and supports for the wheel 10, whether configured in the freestanding or mounted versions. The axis of rotation for the wheel 10 is defined by the bearing 25 located behind the back wall 12 which cannot obstruct the ingress and egress of the animal from the wheel 10, or interfere with the animal during the use of the wheel 10. In addition to the floor matting 14, the exercise wheel 10 can be provided with a number of optional attachments that are not depicted in the drawings, including a device for recording the time and/or distance traveled during the operation of the wheel 10, which can be an effective means to show the amount of exercise a kennel-confined animal receives. Such a recording device can be mechanical or electronic and is of a construction that is well known in the art.

Other possible optional attachments could include a reward mechanism that would dispense a treat as a reward to the animal in response to certain achieved parameters, such as the amount of time or distance traveled, accessing the wheel 10, etc. A braking apparatus could also be added to the bearing 25 defining the axis of rotation, or to the rollers 29, to limit the speed of operation of the exercise wheel 10 or to place a variable drag on the rotation of the wheel 10 corresponding to the size of the dog using the wheel 10. Rotation warning devices and a restraint cover could also be provided.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An exercise wheel for use in the exercise of animals, comprising:
    a circular tread portion defining a cylindrical structure terminating at a forward peripheral edge by a circular ring, said tread portion including a first covering on which the canine can walk;
    a back wall oriented generally vertically and being positioned adjacent said tread portion in opposition to said circular ring, said back wall including a second covering to prevent the canine from passing through said back wall while on the tread portion; and
    a support frame providing a three bearing support of said circular tread portion, including a transverse strut supporting an axial bearing located rearwardly of said back wall for rotatably supporting a central shaft projecting only rearwardly of said back wall and defining an axis of rotation for said exercise wheel and a pair of bearings mounting rollers engaged with said tread portion in a circumferentially spaced relationship beneath said circular ring establishing a longitudinally spaced bearing support to rotatably support said tread portion for rotation about said axis of rotation, said support frame extending around said tread portion with said transverse strut being oriented generally horizontally rearwardly of said back wall.

2. The exercise wheel of claim 1 wherein said pair of rollers is engaged with said circular ring.

3. The exercise wheel of claim 2 wherein said central shaft is affixed to a central disk on said back wall and projects rearwardly therefrom away from said back wall, said axial bearing and said rollers being spaced longitudinally to provide a stable three-point stance for said tread portion.

4. The exercise wheel of claim 3 wherein said axial bearing is mounted on a bearing support plate positioned behind said back wall.

5. The exercise wheel of claim 4 wherein said support frame comprises:
    a base portion;
    a pair of upwardly converging support legs extending upwardly from said base portion to terminate at said bearing support plate positioned behind said back wall; and
    a pair of roller support members extending upwardly from said base portion beneath said circular ring, said rollers being rotatably mounted in said roller support members and positioned for engagement with said circular ring in said circumferentially spaced relationship.

6. The exercise wheel of claim 1 wherein said circular ring is formed as an L-shaped member extending around the front peripheral edge of said tread portion, each said roller being engaged with said L-shaped member.

7. The exercise wheel of claim 1 wherein said tread portion is positioned outwardly of said static structure with said circular ring being spaced from said static structure by a gap, said exercise wheel further comprising a seal attached to said static structure and overlapping said gap.

8. The exercise wheel of claim 1 wherein said first covering on said tread portion is a wire mesh.

9. The exercise wheel of claim 8 wherein said back wall is formed with a chamfer at said tread portion defining a sloped buffer between said horizontally extending tread portion and said vertically extending back wall.

10. An exercise wheel for mounting on a vertical exterior wall of a dog kennel, comprising:
    a circular tread portion defining a cylindrical structure terminating at a peripheral edge by a circular ring, said tread portion including a first covering on which the canine can walk;
    a back wall oriented generally vertically and being positioned adjacent said tread portion in opposition to said circular ring, said back wall including a second covering to prevent the canine from passing through said back wall while on the tread portion;
    first and second support members, each said support member including a fixation bracket for connection to said vertical wall;
    a pair of roller support arms, each said roller support arm positioning a roller into engagement with said circular ring at a transversely spaced relationship;
    a mounting arm projecting generally perpendicularly from each said support member and terminating in an attachment bracket located rearwardly of said back wall;
    a transverse strut extending between the opposing said attachment brackets behind said back wall; and
    an axial bearing being mounted on a bearing support plate mounted on said transverse strut, said axial bearing rotatably supporting a central shaft projecting rearwardly of said back wall to define an axis of rotation for said exercise wheel.

11. The exercise wheel of claim 10 wherein said central shaft is affixed to a central disk on said back wall and projects rearwardly therefrom away from said back wall, said tread portion being positioned outwardly of said vertical wall with said circular ring being spaced from said vertical wall by a gap, said exercise wheel further comprising a seal attached to said vertical wall and overlapping said gap.

12. The exercise wheel of claim 11 wherein said first covering on said tread portion is a wire mesh, said back wall being formed with a chamfer at said tread portion to define a sloped buffer between said horizontally extending tread portion and said vertically extending back wall.

13. An exercise wheel for deployment on a dog kennel having a vertical wall, comprising:
    a circular tread portion defining a cylindrical structure terminating at a peripheral edge by a circular ring, said tread portion including a first covering on which the canine can walk;
    a back wall oriented generally vertically and being positioned adjacent said tread portion in opposition to said circular ring, said back wall including a second covering to prevent the canine from passing through said back wall while on the tread portion; and
    a support frame providing a three bearing support of said circular tread portion, including a transverse strut supporting an axial bearing located rearwardly of said back wall for rotatably supporting a central shaft projecting only rearwardly of said back wall and defining an axis of rotation for said exercise wheel, and a pair of bearings mounting a corresponding pair of rollers engaged with said circular ring in a circumferentially spaced relationship beneath said circular ring to rotatably support said tread portion for rotation about said axis of rotation, said rollers being spaced forwardly of said back wall such that said axial bearing and said rollers are spaced longitudinally to provide a three-point stance for said tread portion.

14. The exercise wheel of claim 13 wherein said support frame comprises:
   first and second support members, each said support member including a fixation bracket for connection to said vertical wall;
   a pair of roller support arms positioning said rollers into engagement with said circular ring at said circumferentially spaced relationship;
   a mounting arm projecting generally perpendicularly from each said support member and terminating in an attachment bracket located rearwardly of said back wall; and
   said transverse strut extending between the opposing said attachment brackets behind said back wall, said axial bearing being supported on a bearing support plate mounted on said transverse strut to rotatably support said central shaft.

15. The exercise wheel of claim 14 wherein said roller support arms are connected, respectively, to said support members.

16. The exercise wheel of claim 15 wherein said central shaft is affixed to a central disk on said back wall and projects only rearwardly therefrom away from said back wall.

17. The exercise wheel of claim 16 wherein said tread portion is positioned outwardly of said vertical wall with said circular ring being spaced from said vertical wall by a gap, said exercise wheel further comprising a seal attached to said vertical wall and overlapping said gap.

18. An exercise wheel for deployment in a dog kennel, comprising:
   a circular tread portion defining a cylindrical structure terminating at a peripheral edge by a circular ring, said tread portion including a first covering on which the canine can walk;
   a back wall oriented generally vertically and being positioned adjacent said tread portion in opposition to said circular ring, said back wall including a second covering to prevent the canine from passing through said back wall while on the tread portion; and
   a support frame associated with a portion of a wall positioned around said circular ring such that said circular ring defines an opening in said portion of said wall, said support frame providing a three bearing support of said circular tread portion, including a transverse strut supporting an axial bearing rotatably supporting a central shaft projecting rearwardly of said back wall and defining an axis of rotation for said exercise wheel, and a pair of bearings corresponding to a pair of rollers engaged with said circular ring in a circumferentially spaced relationship beneath said circular ring to rotatably support said tread portion for rotation about said axis of rotation, said support frame extending around said tread portion with said transverse strut being oriented generally horizontally rearwardly of said back wall.

19. The exercise wheel of claim 18 wherein said support frame comprises:
   first and second support members, each said support member including a fixation bracket for connection to said portion of said wall; and
   a pair of roller support arms positioning rollers into engagement with said circular ring at said circumferentially spaced relationship.

* * * * *